2,709,477

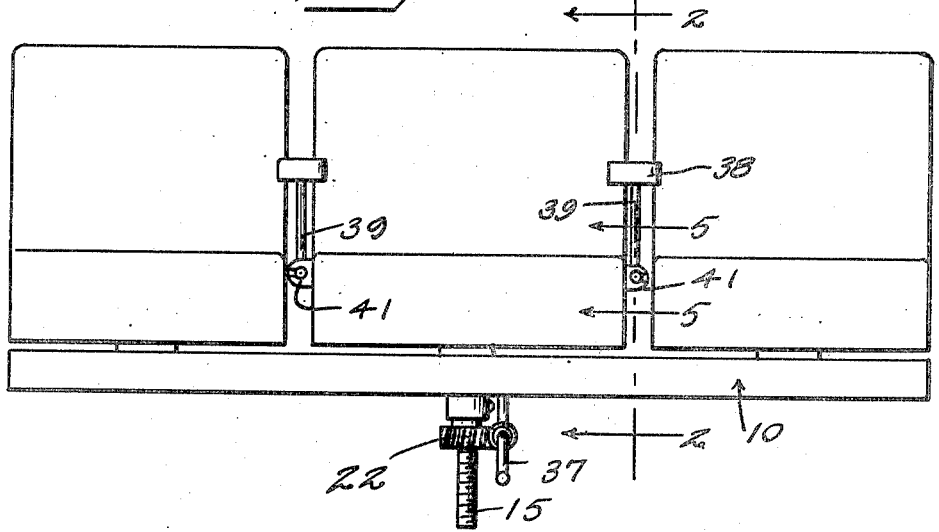
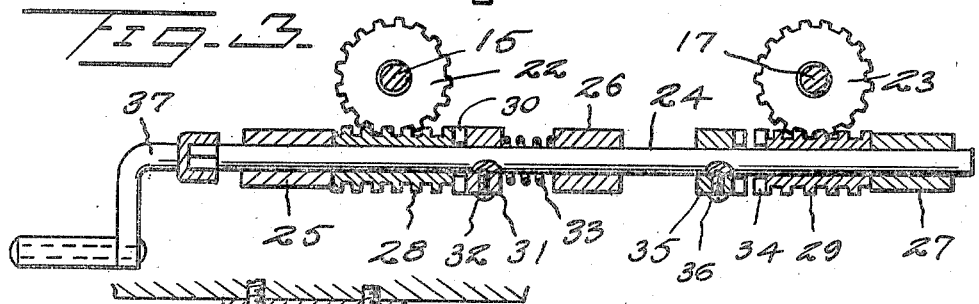
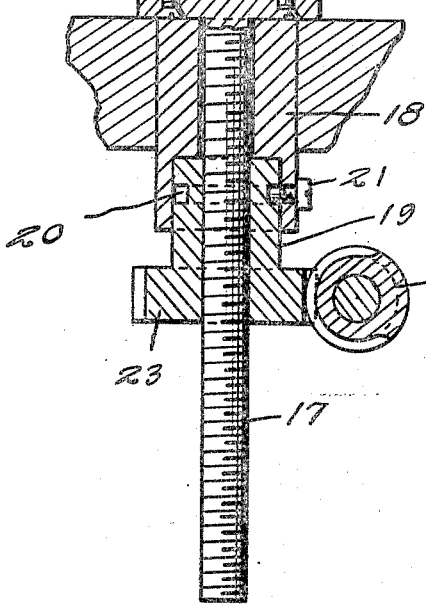

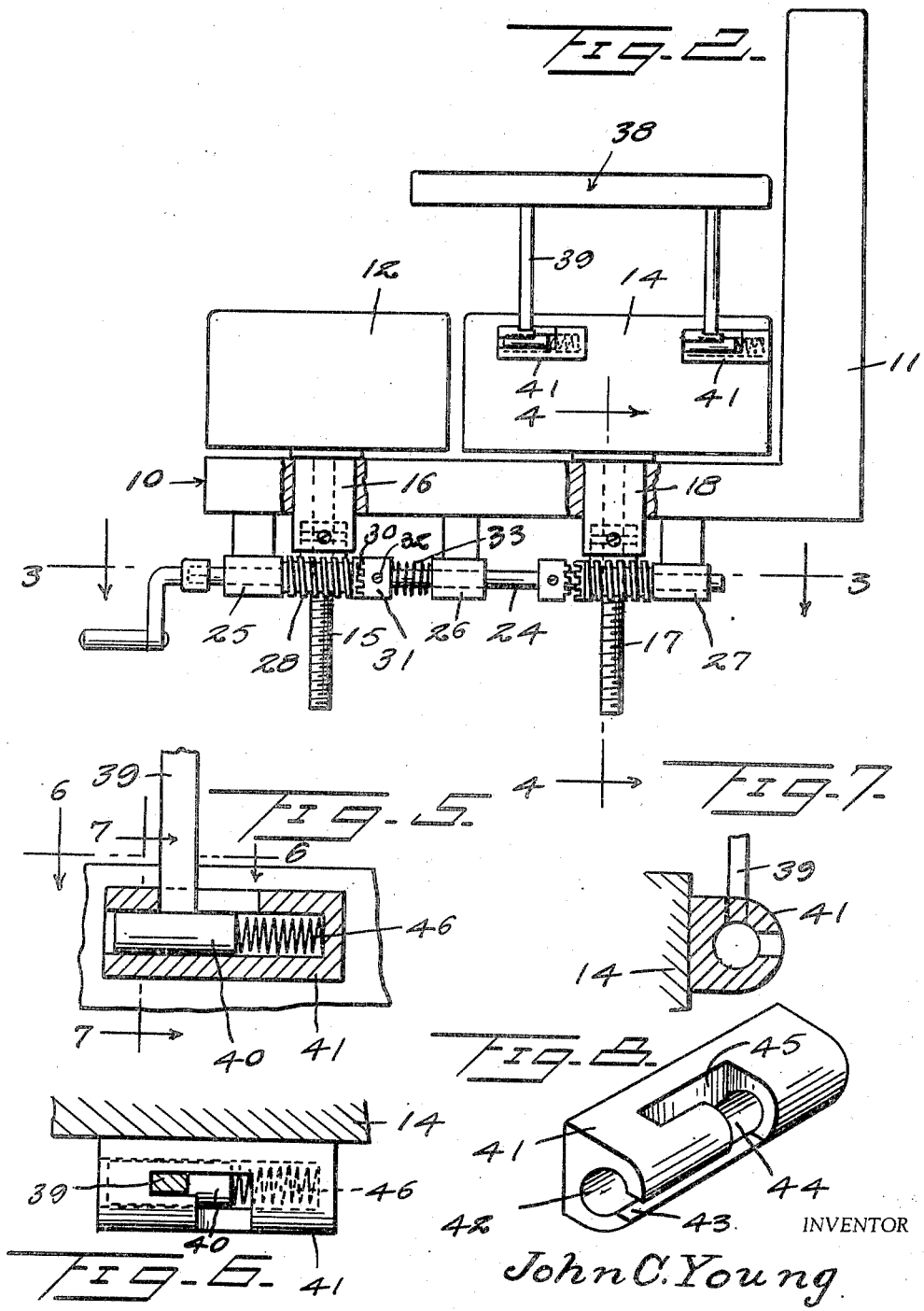

United States Patent Office

Patented May 31, 1955

2,709,477

VERTICALLY ADJUSTABLE VEHICLE SEAT

John C. Young, Pittsburgh, Pa.

Application January 12, 1953, Serial No. 330,816

1 Claim. (Cl. 155—10)

This invention relates to vertically adjustable motor vehicle seats.

An object of this invention is to provide an improved vehicle seat which is designed particularly for babies and small children, so that a young child will be able to look out of the windows without standing up and may be strapped or otherwise secured in the seat.

Another object of this invention is to provide an improved vehicle seat which is formed of a front section and a rear section, with each section capable of being elevated, with the front section forming a foot rest when the rear section is raised above the front section, or both sections to be raised equally for a young child to have full view.

A further object of this invention is to provide in a vehicle seat, a pair of arm rests with an improved means for removably supporting the rests.

With the above and other objects in view, my invention consists in the arrangement, combination and details of construction disclosed in the drawings and specification, and then more particularly pointed out in the appended claim.

In the drawings—

Figure 1 is a detailed front elevation of an adjustable seat construction constructed according to an embodiment of this invention, Figure 2 is a sectional view taken substantially on the line 2—2 of Figure 1, Figure 3 is a sectional view taken on the line 3—3 of Figure 2, Figure 4 is a fragmentary sectional view taken on the line 4—4 of Figure 2, Figure 5 is a fragmentary sectional view taken on the line 5—5 of Figure 1, Figure 6 is a sectional view taken on the line 6—6 of Figure 5, Figure 7 is a sectional view taken on the line 7—7 of Figure 5, Figure 8 is a perspective view of one of the arm rest supporting and locking members.

Referring to the drawings, the numeral 10 designates generally a base structure which includes an upstanding back 11. A pair of intermediate seat members 12 and 14 are disposed in the frame 10, and the seat members 12 and 14 which are divided or separated transversely of the frame 10, are adapted to be vertically adjusted as will be hereinafter described.

Seat member 12 has secured to the bottom thereof a jack shaft 15 which loosely engages through a vertically disposed guide 16 which is carried by the base frame 10. Rear seat member 14 has fixed to the bottom thereof a jack shaft 17 which loosely engages through a guide or bushing 18 which is fixed in the frame 10. As shown in Figure 4, the jack shaft 17 has mounted thereon a nut 19 which is formed with an annular groove 20 within which a pin 21 engages so that the nut 19 will be held against endwise movement.

The jack shaft 15 also has a nut similar to nut 19, whereby rotation of each nut will provide for upward or downward movement of the respective seat members. Jack shaft 15 has associated therewith a worm gear 22 which is fixed relative to the nut engaging shaft 15, and jack shaft 17, as shown in Figure 4, has a worm gear 23 which is fixed relative to the nut 19.

A seat adjusting shaft 24 is rotatably carried by bearings 25 and 26 and 27 which are fixed relative to the frame or base 10. Shaft 24 has loosely mounted thereon a worm 28 which meshes with worm gear 22, and also has a second worm 29 which meshes with worm gear 23. The rear or inner end of worm 28 is formed with one portion 30 of a dental or toothed clutch with which a complementary toothed clutch 31 is adapted to normally engage.

Clutch 31 is secured by fastening means 32 to shaft 24 and a spring 33 is interposed between clutch member 31 and bearing 26. The forward end of worm 29 is formed as one part of a toothed clutch, as indicated at 34, and a complementary toothed clutch 35 is fixed by fastening means 36 to shaft 24. Clutch 35 is normally disengaged from clutch 34, but is moved into engagement therewith by inward endwise movement of shaft 24, at which time clutch 31 will be disengaged from clutch 30.

A crank member 37 is mounted on the outer or forward end of shaft 24 so that this shaft may be manually rotated to effect raising or lowering of a selected one of the seat members 12 or 14. Seat member 14 has mounted on the opposite sides thereof a pair of arm rests 38 which include depending bars 39, having a rounded slide member 40 fixed thereto.

A bushing block 41 is fixed to the outer side of seat member 14 and is provided with a longitudinal bore 42 within which the slide member 40 is adapted to loosely engage. The bushing 41 is also formed with a longitudinal slot 43 which merges with a transverse slot 44 and the latter communicates with a keeper slot 45.

A spring 46 is disposed in the inner end of the bore 42 and is adapted to normally urge the slide member 40 forwardly so that when the bars 39 are in a vertical position, the bars 39 will engage in the keepers 45. The bars 39 are removed from the bushings or supporting members 41 by rearward movement which will dispose the bars 39 in the transverse slots 44 and then downward swinging of the bars 39 through an arc of substantially 90° will dispose the bars 39 in a position to be moved forwardly in the longitudinal slot 43. Where a small child is to be seated in the intermediate seat structure, this child may be seated on the rear seat member 14 and this seat member may be raised upwardly by inward movement of shaft 24 to engage clutch member 35 with clutch member 34. Rotation of shaft 24 may then effect raising of seat member 14 to the desired degree, and the feet of the child may rest on the front seat member 12.

It will be understood that if desired a strap or other restraining means may be secured between the arm rests 38 so that the child will not fall forwardly. The structure hereinbefore described will provide an intermediate seat structure which can be used with small children or with adults, it being understood that where adults are seated in the intermediate seat the arm rests 38 may be removed as hereinbefore described.

I do not mean to confine myself to the exact details of construction herein disclosed, but claim all variations falling within the purview of the appended claim.

What I claim is:

A vehicle seat comprising front and rear seat sections, a jack screw dependingly carried by each section, a stationary guide for each jack screw, a combined nut and worm gear rotatably engaging said guide and threaded onto a jack screw, a shaft, means rotatably and slidably supporting said shaft at right angles to said jack screw, a pair of worms loose on said shaft engaging said worm gears, clutch means formed on the confronting ends of said worms, a pair of complementary clutch members fixed on said shaft, a spring normally urging said shaft endwise to hold one of said clutch members in engagement with a clutch means carried by one of said worms to elevate one of said seats, and a crank on one end of said shaft for rotating and sliding said shaft against the bias of said spring to disengage said one member from its associated clutch means and engage the other clutch member with its associated clutch means to elevate the other of said seats.

References Cited in the file of this patent

UNITED STATES PATENTS

| | | |
|---|---|---|
| 850,744 | Flanders | Apr. 16, 1907 |
| 1,166,702 | Mardon et al. | Jan. 4, 1916 |
| 1,675,547 | Grimmich | July 3, 1928 |
| 1,710,465 | Acosta | Apr. 23, 1929 |
| 2,328,243 | Wood | Aug. 31, 1943 |
| 2,522,759 | Lindquist | Sept. 19, 1950 |
| 2,526,248 | Luketa | Oct. 17, 1950 |